United States Patent
Ao

(10) Patent No.: US 9,059,791 B2
(45) Date of Patent: Jun. 16, 2015

(54) METHOD AND APPARATUS FOR PROTECTING TUNNEL

(75) Inventor: Ting Ao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 331 days.

(21) Appl. No.: 13/519,429

(22) PCT Filed: Jun. 10, 2010

(86) PCT No.: PCT/CN2010/073778
§ 371 (c)(1),
(2), (4) Date: Jun. 27, 2012

(87) PCT Pub. No.: WO2010/148958
PCT Pub. Date: Dec. 29, 2010

(65) Prior Publication Data
US 2012/0300617 A1    Nov. 29, 2012

(30) Foreign Application Priority Data
Dec. 31, 2009    (CN) .......................... 2009 1 0261855

(51) Int. Cl.
*H04L 12/707* (2013.01)
*H04B 1/74* (2006.01)
*H04L 12/46* (2006.01)
*H04L 12/703* (2013.01)

(52) U.S. Cl.
CPC ............. *H04B 1/74* (2013.01); *H04L 12/4625* (2013.01); *H04L 12/4633* (2013.01); *H04L 45/22* (2013.01); *H04L 45/28* (2013.01); *H04L 2212/0025* (2013.01)

(58) Field of Classification Search
CPC ............. H04L 29/14; H04L 41/0654–41/0677; H04L 45/28
USPC .................................................. 370/216–228
See application file for complete search history.

(56) References Cited

U.S. PATENT DOCUMENTS

| | | | |
|---|---|---|---|
| 2003/0147344 A1* | 8/2003 | Stewart et al. | 370/216 |
| 2010/0214909 A1* | 8/2010 | Ceccarelli et al. | 370/228 |
| 2012/0120809 A1* | 5/2012 | Gero et al. | 370/241.1 |

FOREIGN PATENT DOCUMENTS

| | | |
|---|---|---|
| CN | 1540940 A | 10/2004 |
| CN | 1659835 A | 8/2005 |
| CN | 1969492 A | 5/2007 |
| CN | 101431466 A | 5/2009 |

OTHER PUBLICATIONS

He LV, The State of Intellectual Property Office, The P.R. China, International Search Report, 10 pages, Oct. 21, 2012.

* cited by examiner

*Primary Examiner* — Pao Sinkantarakorn
(74) *Attorney, Agent, or Firm* — McGarry Bair PC

(57) ABSTRACT

The present invention discloses a method and an apparatus for protecting a tunnel, wherein the method comprises: setting a second protection group on two intermediate nodes of a first protection group; when a segment between the two intermediate nodes fails, adopting the second protection group to protect the tunnel. The present invention solves the problem in a relevant art that it is very difficult to configure multiple protection segments for one working segment and it might be limited by various conditions, such as network resources and the like; therefore, the utilization rate and the reliability of the network resources are improved.

15 Claims, 5 Drawing Sheets

METHOD AND APPARATUS FOR PROTECTING TUNNEL

CROSS-REFERENCE TO RELATED APPLICATIONS

This application is a National Phase application of International Application No. PCT/CN2010/073778, filed Jun. 10, 2010, which claims the benefit of Chinese Patent Application No. 200910261855.9, filed Dec. 31, 2009, both of which are incorporated herein by reference in their entirety.

FIELD OF THE INVENTION

The present invention relates to the field of communication, and in particular to a method and an apparatus for protecting a tunnel.

BACKGROUND OF THE INVENTION

With the development of a carrier-grade Ethernet, in order to make the Ethernet achieve the carrier-grade standard, a higher demand is put forward to a protection and a switch of the Ethernet. An existing Provider Backbone Bridge Traffic Engineering (PBB-TE) protection switch technology currently supports a protection for a Traffic Engineering Service Instance (TESI), that is, an end-to-end tunnel protection. The end-to-end protection solution not only has a relatively long protection switch time, but also involves too many nodes, and can not protect intermediate links and nodes thereof. Once a certain intermediate link or a certain node fails, the entire TESI must be switched; and if a plurality of TESIs pass through the failed link or node, the plurality of TESIs must be switched too. That is to say, the protected objects of the PBB-TE end-to-end protection are TESIs. When it is detected that a certain working TESI fails, it is needed to re-encapsulate a user message, which enters the PBB-TE tunnel, with another protection TESI, so that the traffic can pass through the protection PBB-TE tunnel. For the Ethernet, the link protection and the node protection are part of the Ethernet protection, and most network failures occur on a certain link or node, therefore, a PBB-TE segment protection becomes more important, and several operators have proposed a requirement on the PBB-TE segment protection, that is, a protection segment is specially configured in a working segment of the PBB-TE tunnel to protect the working segment. The working segment and the protection segment form an Infrastructure Protection Group (IPG).

FIG. 1 shows a schematic diagram of a PBB-TE segment protection according to a relevant art. As shown in FIG. 1, a protection group contains one working segment and one or a plurality of protection segments. In a normal case, if no failure is detected on the working segment, all traffic protected by the PBB-TE segment protection group is forwarded on the working segment. Once the working segment fails or a certain management command is received, a Segment Edge Bridge (SEB) of an end point segment of the PBB-TE segment protection group can detect the failure in time, then the SEB would trigger update of a forwarding database (FDB), so that an egress port in the forwarding database corresponding to a TESI protected by the protection domain IPG is modified to be an egress port corresponding to the protection segment on the SEB, and the traffic is switched to the protection segment. In this way, the protection for the working segment is realized, the normal forwarding of the network traffic is guaranteed and the reliability of a network is improved. At present, a project has been set up for the technology of the PBB-TE segment protection in a standard organization of the Institute of Electrical and Electronics Engineers (IEEE). This project not only supports 1:1 PBB-TE segment protection, but also provides a solution of M:1 PBB-TE segment protection, that is, an M:1 PBB-TE segment protection group consists of one working segment and M protection segments, wherein the M (M is greater than 1) protection segments protect the one working segment. This solution can greatly improve the reliability of a system.

In a Connectivity Check Message (CCM) detection mechanism of the PBB-TE segment protection, the mechanism adopted in a failure detection is implemented by a CCM defined in the 802.1ag standard.

FIG. 2 shows a schematic diagram of a PBB-TE segment and a failure detection mechanism thereof according to a relevant art. As shown in FIG. 2, there is one segment in a PBB-TE network, with two end points being a Segment Edge Port (SEP) 1 and an SEP2 at port ends, wherein, SEB can be a Backbone Edge Bridge (BEB) apparatus in the PBB-TE network, also can be a Backbone Core Bridge (BCB) apparatus; both the SEP1 and the SEP2 are Provider Network Ports (PNPs), and a Segment Intermediate Bridge (SIB) apparatus on Segment Intermediate Ports (SIPs) of this segment can be a BCB. A Media Access Control (MAC) address of the SEP1 is MAC1 and an MAC address of the SEP2 is MAC2. It is needed to configure an Ethernet Switch Path (ESP) for a CCM on the intermediate apparatus SIB of the segment to forward the CMM. A 3-tuple of an ESP1 from the SEP2 to the SEP1 is <MAC1, MAC2, BVID1>; a 3-tuple of an ESP2 from the SEP1 to the SEP2 is <MAC2, MAC1, BVID2>, in which, MAC is the acronym of Media Access Control and BVID is the acronym of Bridge Local Area Network Identifier (BVID). A CCM1 sent from the SEP 2 to the SEP1 would carry the 3-tuple of <MAC1, MAC2, BVID1> and be forwarded along the path of the ESP1; a CCM2 sent from the SEP1 to the SEP2 would carry the 3-tuple of <MAC2, MAC1, BVID2> and be forwarded along the path of the ESP2. Through the CCM1 and the CCM2, the failure detection on the segment between the SEP1 and the SEP2 is implemented.

FIG. 3 shows a schematic diagram of a PBB-TE working segment, a PBB-TE protection segment, an SEB and an SIB according to a relevant art. As shown in FIG. 3, wherein a member segment refers to a working segment or a protection segment of o protection group, wherein the working segment refers to one segment through which traffic passes when no failure is detected on the segment;

the protection segment refers to one segment which bears the traffic after the occurrence of a switch due to the detection of a failure on the working segment or the reception of a switch management command;

a pair of SEBs are two end points configured to terminate a segment, wherein the SEB can be a BEB apparatus in a PBB-TE network, or can be a BCB apparatus; bridge apparatus within the segment are SIBs.

IPG traffic switch refers that a group of TESI traffic protected by the IPG is redirected to the protection segment from the working segment, or to the working segment from the protection segment, wherein the redirection generally is implemented by modifying an egress port of a corresponding table entry of the TESI in a forwarding database.

However, in many cases, it is very difficult to configure multiple protection segments for one working segment and it might be limited by various conditions, such as network resources and the like.

SUMMARY OF THE INVENTION

The present invention provides a method and an apparatus for protecting a tunnel, so as to at least solve the above problem that it is very difficult to configure multiple protection segments for one working segment and it might be limited by various conditions, such as network resources and the like.

According to one aspect of the present invention, a method for protecting a tunnel is provided, comprising: setting a second protection group on two intermediate nodes of a first protection group; and when a segment between the two intermediate nodes fails, adopting the second protection group to protect the tunnel.

Preferably, the step of adopting the second protection group to protect the tunnel comprises: setting a duration of a first timer to be longer than that of a second timer, wherein the first timer is configured to record a duration of waiting for a protection switch after the first protection group fails, and the second timer is configured to record a duration of waiting for a protection switch after the second protection group fails.

Preferably, the step of adopting the second protection group to protect the tunnel further comprises: adding, to a protected member of the second protection group, a 2-tuple in a 3-tuple of an Ethernet Switch Path (ESP) corresponding to a Connectivity Check Message (CCM) through which a member segment of the first protection group performs a failure detection, wherein the 3-tuple of the ESP is <ESP-DA, ESP-SA, ESP-VID> and the 2-tuple is <ESP-DA, ESP-VID>; the ESP-DA is a destination Media Access Control (MAC) address of the ESP configured for forwarding a CCM, which is dedicated to an inter-segment failure diagnosis, on a working segment or a protection segment; the ESP-SA is a source MAC address of the ESP configured for forwarding the CCM, which is dedicated to the inter-segment failure diagnosis, on the working segment or the protection segment; and the ESP-VID is a Virtual Local Area Network Identification (VLAN ID) to which a member segment, in which the second protection group is located, of the first protection group belongs.

Preferably, the source MAC address and/or the destination MAC address are/is MAC address(es) of Segment Edge Port(s) (SEP(s)) of the protection group.

Preferably, the first timer and/or the second timer are/is hold-off timer(s).

According to another aspect of the present invention, a method for protecting a tunnel is provided, comprising: nesting a first Infrastructure Protection Group (IPG1) and a second Infrastructure Protection Group (IPG2), wherein two SEPs and all Segment Intermediate Ports (SIPs) of one member segment in the IPG1 share ports with all SIPs of one member segment in the IPG2; and using the IPG1 and the IPG2 to associate a same group of tunnels.

Preferably, both the IPG1 and the IPG2 comprise a working segment and a protection segment; and the step of using the IPG1 and the IPG2 to associate the same group of tunnels comprises: when the working segment in the IPG1 is unavailable, adopting the protection segment in the IPG1 to protect the tunnel.

Preferably, both the IPG1 and the IPG2 comprise a working segment and a protection segment; and the step of using the IPG1 and the IPG2 to associate the same group of tunnels comprises: when both the working segment and the protection segment in the IPG1 are unavailable, adopting the protection segment in the IPG2 to protect the tunnel.

Preferably, the IPG1 is an internal IPG and the IPG2 is an external IPG.

Preferably, both the IPG1 and the IPG2 comprise a working segment and a protection segment; and the step of using the IPG1 and the IPG2 to associate the same group of tunnels comprises: configuring an independent Maintenance Association (MA) on the working segment and the protection segment of the IPG1 and on the working segment and the protection segment of the IPG2 respectively, wherein the MA is used to detect states of the working segment and the protection segment in the IPG1 and the IPG2.

Preferably, the step of using the IPG1 and the IPG2 to associate the same group of tunnels comprises: setting duration of a first timer of the IPG2 to be longer than that of a second timer of the IPG1.

Preferably, the first timer is a hold-off timer, related to the IPG2, for recording hold-off duration from the occurrence of a failure to the occurrence of a protection switch; the second timer is a hold-off timer, related to the IPG1, for recording hold-off duration from the occurrence of a failure to the occurrence of a protection switch.

Preferably, the step of using the IPG1 and the IPG2 to associate the same group of tunnels comprises: detecting the member segment in the IPG2 using a group of CCMs; and configuring to add, on an end point of the IPG1 that a CCM enters, forwarded information of a layer-2 header corresponding to the CCM, which enters the IPG1, to a protection list associated with the end point.

Preferably, the layer-2 header is a 3-tuple of <ESP-DA, ESP-SA, ESP-VID>; the forwarded information consists of a 2-tuple of <ESP-DA, ESP-VID>; and the protection list is a 2-tuple list associated with the end point of the IPG1.

Preferably, the tunnels associated by the IPG1 and the IPG2 together are Traffic Engineering Service Instances (TE-SIs).

Preferably, the member segment in the IPG1 is a working segment or a protection segment in the IPG1; and the member segment in the IPG2 is a working segment or a protection segment in the IPG2.

According to still another aspect of the present invention, an apparatus for protecting a tunnel is provided, comprising: a setting module, configured to set a second protection group on two intermediate nodes of a first protection group; and a protection module, configured to adopt the second protection group to protect the tunnel when a segment between the two intermediate nodes fails.

Preferably, the protection module comprises: a setting sub-module, configured to set a duration of a first timer to be longer than that of a second timer, wherein the first timer is configured to record a duration of waiting for a protection switch after the first protection group fails, and the second timer is configured to record a duration of waiting for a protection switch after the second protection group fails.

Preferably, the protection module further comprises: an adding sub-module, configured to add, to a protected member of the second protection group, a 2-tuple in a 3-tuple of an ESP corresponding to a CCM through which a member segment of the first protection group perform a failure detection, wherein the 3-tuple of the ESP is <ESP-DA, ESP-SA, ESP-VID> and the 2-tuple is <ESP-DA, ESP-VID>; the ESP-DA is a destination MAC address of the ESP configured for forwarding a CCM, which is dedicated to an inter-segment failure diagnosis, on a working segment or a protection segment; the ESP-SA is a source MAC address of the ESP configured for forwarding the CCM, which is dedicated to the inter-segment failure diagnosis, on the working segment or the protection segment; the ESP-VID is a VLAN ID to which a member segment, in which the second protection group is located, of the first protection group belongs.

In accordance with the present invention, a second protection group is set on two intermediate nodes of a first protection group, and the second protection group is adopted to protect the tunnel when a segment between the two intermediate nodes fails, thereby solving the problem that it is very difficult to configure multiple protection segments for one working segment and it might be limited by various conditions, such as network resources and the like. Therefore, the utilization rate and the reliability of the network resources are improved.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention is described below in detail by reference to the accompanying drawings in conjunction with embodiments. It should be noted that the embodiments in the application and the characteristics of the embodiments can be combined if no conflict is caused.

According to an embodiment of the present invention, a method for protecting a tunnel is provided. A structure involved in an implementation process of the embodiment of the present invention is described below.

In the embodiment of the present invention, nesting of protection groups refers that one protection group contains another protection group in a network topology.

Figure 1:
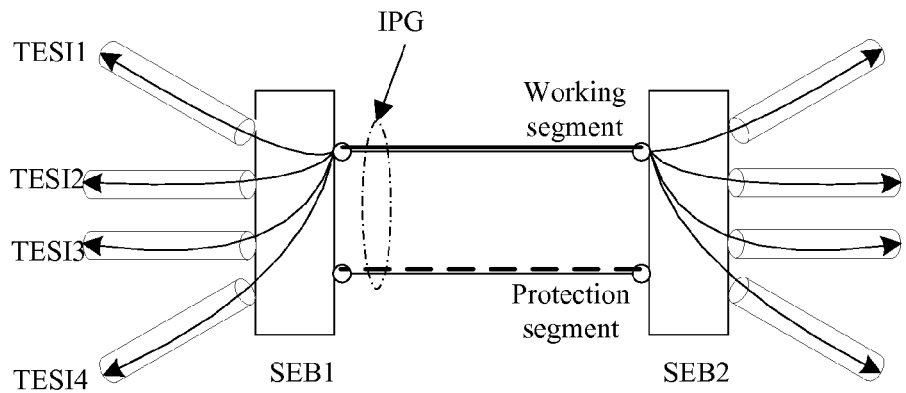
FIG. 1 shows a schematic diagram of a PBB-TE segment protection according to a relevant art.
Figure 2:
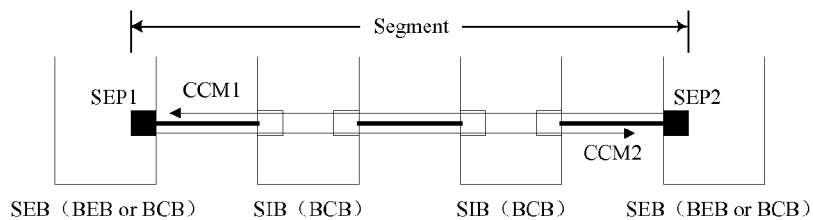
FIG. 2 shows a schematic diagram of a PBB-TE segment and a failure detection mechanism thereof according to a relevant art.
Figure 3:
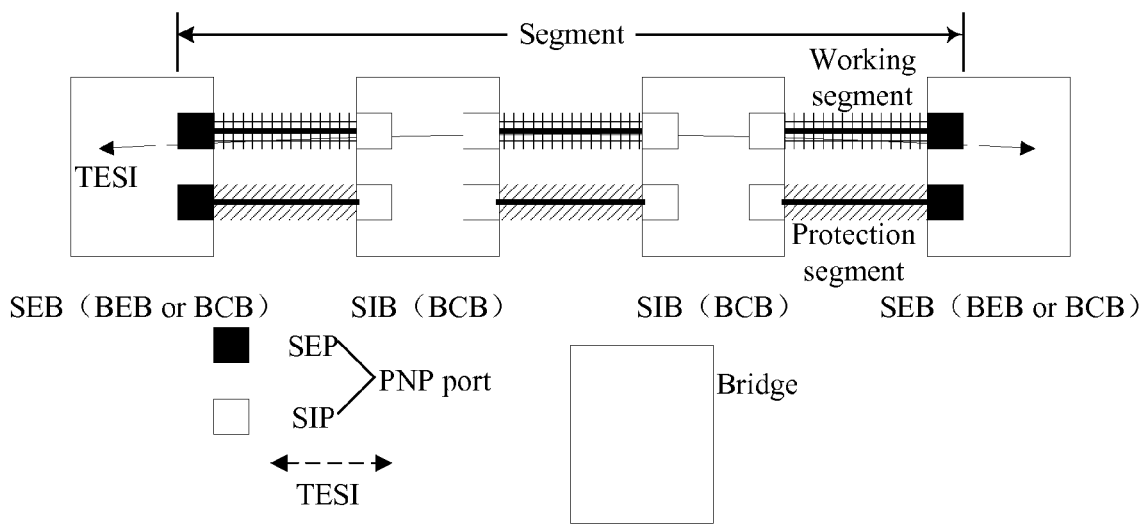
FIG. 3 shows a schematic diagram of a PBB-TE working segment, a PBB-TE protection segment, an SEB and an SIB according to a relevant art.
Figure 4:
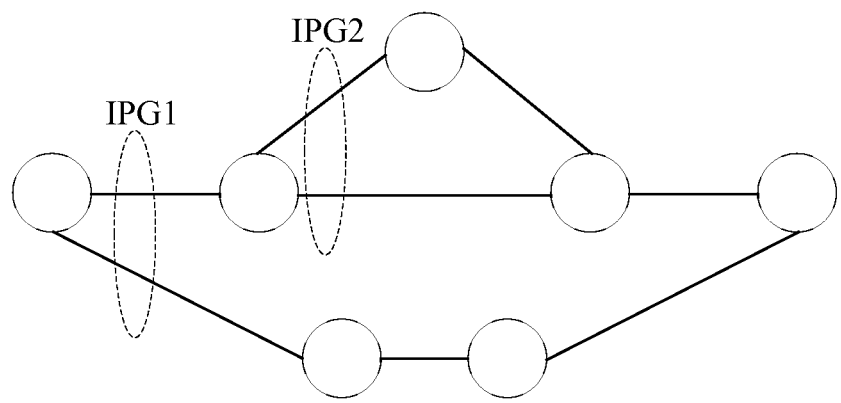
FIG. 4 shows a schematic diagram of a network topology in which a protection group is nested in another protection group according to an embodiment of the present invention.

FIG. 4 shows a schematic diagram of a network topology in which a protection group is nested in another protection group according to an embodiment of the present invention. As shown in FIG. 4, in the topology with a nesting structure of protection groups, an IPG2 is nested in an IPG1, that is, all member segments of the IPG2 are included in one certain member segment of the IPG1. However, the IPG1 and the IPG2 have no SEB overlapped, that is, the SEB of the IPG1 is different from the SEB of the IPG2.

In the embodiment of the present invention, a protection group cluster refers to a cluster of protection groups having a certain association relationship, that is, the protection groups protect the same TESI. Therefore, it is necessary to coordinate each protection group in the protection group cluster when a switch occurs. As shown in FIG. 4, for the IPG1 and the IPG2, when a switch occurs on the IPG2, the IPG1 does not perform switch. Only when both the working segment and the protection segment in the IPG2 have a failure, a traffic switch occurs on the IPG1.

Figure 5:
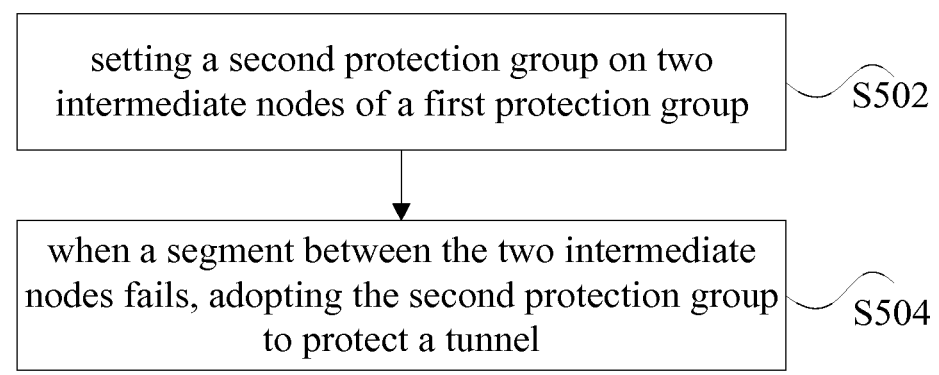
FIG. 5 shows a preferable flowchart of a method for protecting a tunnel according to an embodiment of the present invention.

FIG. 5 shows a flowchart of a method for protecting a tunnel according to an embodiment of the present invention. As shown in FIG. 5, the method for protecting the tunnel according to the embodiment of the present invention can comprise the steps as follows.

Step 502: a second protection group (that is, IPG2) is set on two intermediate nodes of a first protection group (that is, IPG1), wherein the two intermediate nodes of the first protection group are two intermediate nodes of a working segment of the first protection group or two intermediate nodes of a protection segment of the first protection group. An SEB of the first protection group is different from that of the second protection group.

Step 504: when a segment between the two intermediate nodes fails, the second protection group is adopted to protect the tunnel.

Specifically, in order to make the IPG1 and the IPG2 protect the same TESI, the following operations need to be performed simultaneously.

(1) Setting a duration of a first timer to be longer than that of a second timer, wherein the first timer is configured to record the duration of waiting for a protection switch after the first protection group fails, and the second timer is configured to record the duration of waiting for a protection switch after the second protection group fails; wherein the first timer and/or the second timer can be a hold-off timer for the protection switch of the protection group.

Namely, the hold-off timer of the IPG1 is increased, so that hold-off timerIPG1> hold-off timerIPG2, that is, the switch of the IPG2 is ensured to be finished before the switch of the IPG1 starts. In the above, the hold-off timer indicates that the protection switch is performed only when the hold-off timer expires and the failure still exists after the failure is detected; the hold-off timerIPG1 is the hold-off timer of the IPG1; and the hold-off timerIPG2 is the hold-off timer of the IPG2.

(2) Adding, to a protected member of the second protection group, a 2-tuple in a 3-tuple of an ESP corresponding to a CCM used for a failure detection of a member segment of the first protection group, wherein the 3-tuple of the ESP is <ESP-DA, ESP-SA, ESP-VID> and the 2-tuple is <ESP-DA, ESP-VID>; the ESP-DA is a destination MAC address of the ESP configured for forwarding a CCM, which is dedicated to an inter-segment failure diagnosis, on a working segment or a protection segment; the ESP-SA is a source MAC address of the ESP configured for forwarding the CCM, which is dedicated to the inter-segment failure diagnosis, on the working segment or the protection segment; the ESP-VID is a VLAN ID to which the member segment, in which the second protection group is located, of the first protection group belongs. Preferably, the ESP-DA and ESP-SA are the MAC addresses of the ESPs of the end points the segment, that is, the source MAC address and/or the destination MAC address are/is the MAC address(es) of the SEP(s) of the segment of the first protection group.

Preferably, the source MAC address and/or the destination MAC address are/is the MAC address(es) of the SEP(s) of the protection group.

Preferably, the first timer and/or the second timer are/is hold-off timer(s).

Through the embodiment above, an implementation solution of nesting a protection group in another protection group is provided. For a very important part of a path, a special protection can be implemented through the nesting of protection groups. Therefore, the utilization rate and the reliability of network resources are improved, and the important part of the path is particularly protected.

Figure 6:
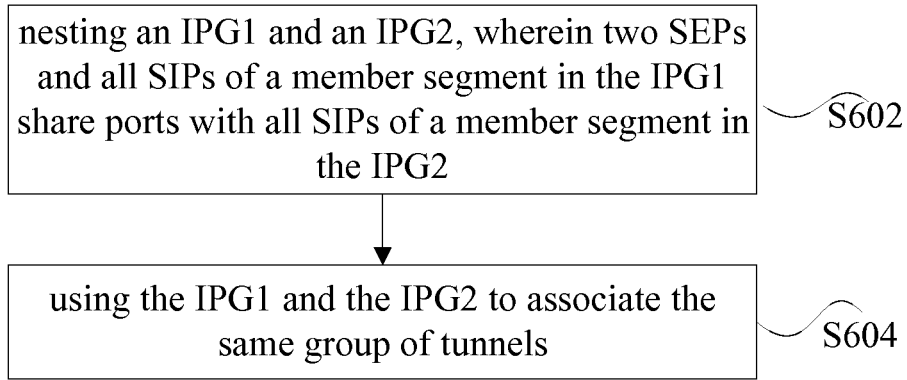
FIG. 6 shows another preferable flowchart of a method for protecting a tunnel according to an embodiment of the present invention.

The present invention further provides another method for protecting a tunnel. As shown in FIG. 6, the method for protecting the tunnel in a preferable embodiment comprises the following steps:

Step 602: a first Infrastructure Protection Group IPG1 and a second Infrastructure Protection Group IPG2 are nested, wherein two SEPs and all SIPs of one member segment in the IPG1 share ports with all SIPs of one member segment in the IPG2.

Step 604: the IPG1 and the IPG2 are used to associate the same group of tunnels.

Through the preferable embodiment, the IPG1 and the IPG2 are used to associate the same group of tunnels; when the working segment in the IPG1 is unavailable, the protection segment in the IPG1 is adopted to protect the tunnel, thereby solving the problem that it is difficult to configure multiple protection segments for one working segment and it might be limited by various conditions, such as network resources and the like; therefore, the utilization rate and the reliability of network resources are improved.

Preferably, both the IPG1 and the IPG2 comprise a working segment and a protection segment; and the step of using the IPG1 and the IPG2 to associate the same group of tunnels comprises: when the working segment in the IPG1 is unavailable, adopting the protection segment in the IPG1 to protect the tunnel.

Preferably, both the IPG1 and the IPG2 comprise a working segment and a protection segment; and the step of using the IPG1 and the IPG2 to associate the same group of tunnels comprises: when both the working segment and the protection segment in the IPG1 are unavailable, adopting the protection segment in the IPG2 to protect the tunnel.

Preferably, the IPG1 is an internal IPG and the IPG2 is an external IPG.

Preferably, both the IPG1 and the IPG2 comprise a working segment and a protection segment; and the step of using the IPG1 and the IPG2 to associate the same group of tunnels comprises: configuring an independent Maintenance Association (MA) on the working segment and the protection segment of the IPG1 and on the working segment and the protection segment of the IPG2 respectively, wherein the MA is used to detect states of the working segment and the protection segment in the IPG1 and the IPG2.

Preferably, the step of using the IPG1 and the IPG2 to associate the same group of tunnels comprises: setting duration of a first timer of the IPG2 to be longer than that of a second timer of the IPG1.

Preferably, the first timer is a hold-off timer, related to the IPG2, for recording hold-off duration from the occurrence of a failure to the occurrence of a protection switch; the second timer is a hold-off timer, related to the IPG1, for recording hold-off duration from the occurrence of a failure to the occurrence of a protection switch.

Preferably, the step of using the IPG1 and the IPG2 to associate the same group of tunnels comprises: detecting the member segment in the IPG2 using a group of CCMs; and configuring to add, on an end point of the IPG1 that a CCM enters, forwarded information of a layer-2 header corresponding to the CCM, which enters the IPG1, to a protection list associated with the end point.

Preferably, the layer-2 header is a 3-tuple of <ESP-DA, ESP-SA, ESP-VID>; the forwarded information consists of a 2-tuple of <ESP-DA, ESP-VID>; and the protection list is a 2-tuple list associated with the end point of the IPG1.

Preferably, the tunnels associated by the IPG1 and the IPG2 together are Traffic Engineering Service Instances (TESIs).

Preferably, the member segment in the IPG1 is a working segment or a protection segment in the IPG1; and the member segment in the IPG2 is a working segment or a protection segment in the IPG2.

The implementation of the technical solution is further described in detail below in conjunction with an accompanying drawing.

Figure 7:
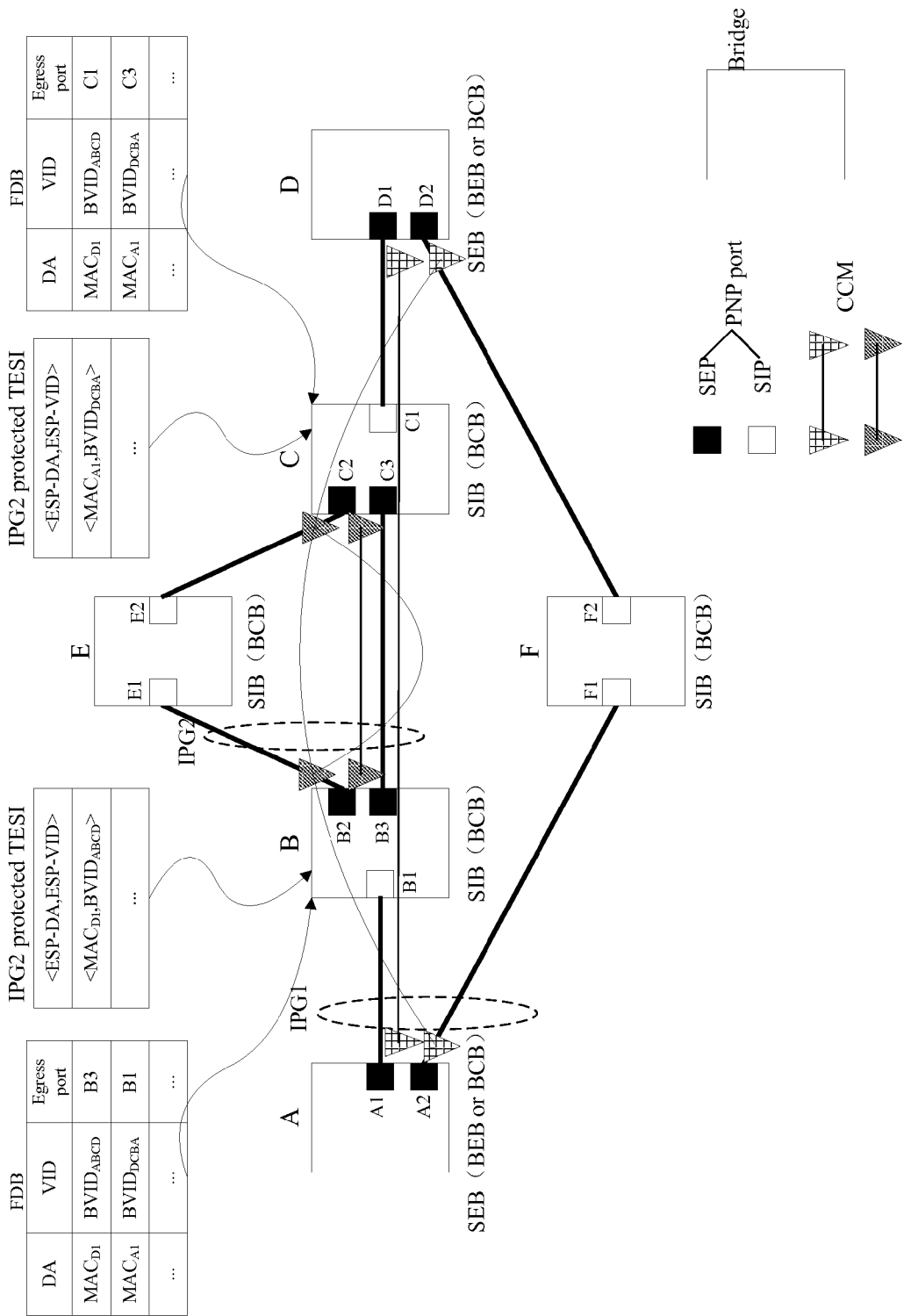
FIG. 7 shows a schematic diagram of a structure for protecting a tunnel according to an embodiment of the present invention.

FIG. 7 shows a schematic diagram of a tunnel protection structure according to an embodiment of the present invention. As shown in FIG. 7, in a PBB-TE network, bridge apparatuses such as A, B, C, D, E and F and links therebetween form a protection group cluster. An IPG2 can cover a working segment of an IPG1, or can cover a protection segment of the IPG1, that is, A-B-C-D shown in FIG. 7 can be the working segment of the IPG1, or can be the protection segment of the IPG1. Hereinafter, the embodiment is illustrated by taking the IPG2 covering the working segment of the IPG1 for example. For example, a working segment A-B-C-D and a protection segment A-F-D protecting the working segment A-B-C-D form a protection group IPG1; a working segment B-C and a protection segment B-E-C protecting the working segment B-C form a protection group IPG2. The operating process between the IPG1 and the IPG2 is as follows: when the working segment B-C fails, the IPG2 performs a switch to switch traffic flowing into the IPG2 to the protection segment B-E-C; only when both the working segment and the protection segment of the IPG2 simultaneously fail, or when A-B (comprising node B) and C-D (comprising node C) fails, the IPG1 performs a switch to switch traffic flowing into the IPG1 to the protection segment A-F-D.

In order to achieve the protection function above, a method is provided as follows.

1. An MA for detecting a working segment of an IPG1 is configured, wherein a 3-tuple corresponding to a CCM in the MA is <$MAC_{D1}, MAC_{A1}, BVID_{ABCD}$> and <$MAC_{A1}, MAC_{D1}, BVID_{DCBA}$>, that is, each forwarding database (FDB) on apparatuses B, C and E has a table entry corresponding to the 3-tuple for forwarding the CCM, as shown in FIG. 7.

2. The IPG1 is configured on A and D, the IPG2 is configured on B and C, and set hold-off timer$_{IPG1}$>hold-off timer$_{IPG2}$.

3. When configuring the protection group IPG2 on the apparatuses B and C, the 3-tuple corresponding to the CCM flowing into the IPG2 for detecting the IPG1 is added into a protected member of the IPG2. As shown in an IPG2 protected TESI list on the apparatuses B and C in FIG. 7, one protected member of the IPG2 on the apparatus B must correspond to <$MAC_{D1}, MAC_{A1}, BVID_{ABCD}$>, and one protected member of the IPG2 on the apparatus C must correspond to <$MAC_{A1}, MAC_{D1}, BVID_{DCBA}$>.

Therefore, when the segment B-C fails, the IPG1 detects that the segment A-B-C-D fails and the IPG2 detects that the segment B-C fails; however, since hold-off timer$_{IPG1}$>hold-off timer$_{IPG2}$, the IPG2 performs a switch first to switch all traffic protected by the IPG2 from the segment B-C to the segment B-E-C, the traffic comprising a CCM message flowing into the IPG2 for detecting the IPG1 segment, at this moment, a path through which the CCM passes is A-B-E-C-D. In the condition that the hold-off timer of the IPG1 expires, it is detected that the CCM is transmitted along A-B-E-C-D at that time, therefore, for the IPG2, the failure is recovered and no switch is needed. Only when both the segment B-C and the segment B-E-C fail simultaneously, the working segment failure is still detected for the CCM of the IPG1 when the hold-off timer$_{IPG1}$ expires; therefore, the IPG1 performs a switch at this moment to switch the traffic to a segment A-F-D. In addition, A-B and C-D are not protected by the IPG2, once they fail, after detecting the failure, the IPG1 performs a switch after waiting for the time period of hold-off timer$_{IPG1}$.

Figure 8:
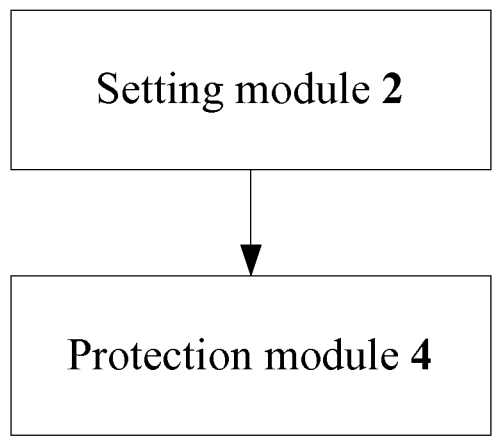
FIG. 8 shows a structure diagram of an apparatus for protecting a tunnel according to an embodiment of the present invention.

According to an embodiment of the present invention, an apparatus for protecting a tunnel is provided, which can be used to implement the forgoing method for protecting the tunnel. FIG. 8 shows a structural diagram of an apparatus for protecting a tunnel according to an embodiment of the present invention. As shown in FIG. 8, the apparatus comprises: a setting module 2 and a protection module 4, wherein the above structure is described below.

The setting module 2 is configured to set a second protection group on two intermediate nodes of a first protection group; the protection module 4 is connected to the setting module 2 and is configured to adopt the second protection group to protect the tunnel when a segment between the two intermediate nodes fails.

Figure 9:
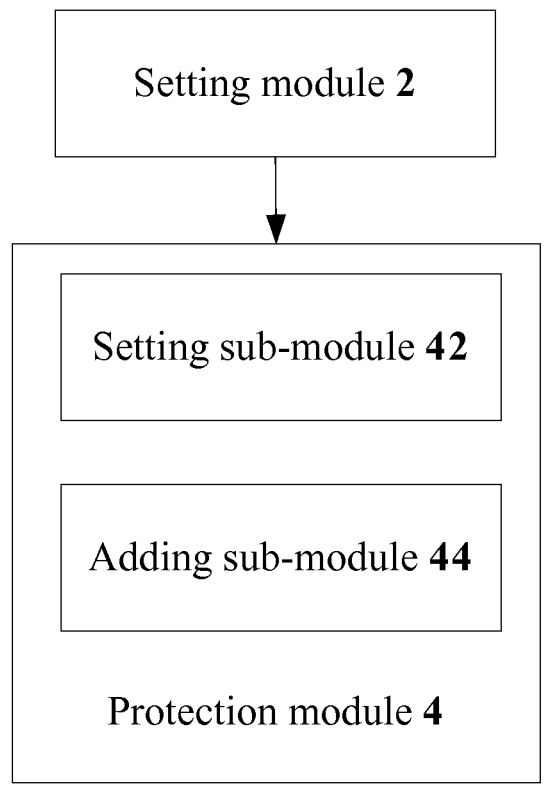
FIG. 9 shows a preferable structure diagram of an apparatus for protecting a tunnel according to an embodiment of the present invention.

FIG. 9 shows a preferable structure diagram of an apparatus for protecting a tunnel according to an embodiment of the present invention. As shown in FIG. 9, the protection module 4 comprises: a setting sub-module 42; preferably, the protection module 4 further comprises an adding sub-module 44, wherein the above structure is described below.

The setting sub-module 42 is configured to set a duration of a first timer to be longer than that of a second timer, wherein the first timer is configured to record a duration of waiting for a protection switch after the first protection group fails, and the second timer is configured to record a duration of waiting for a protection switch after the second protection group fails.

The adding sub-module 44 is configured to add, to a protected member of the second protection group, a 2-tuple in a 3-tuple of an ESP corresponding to a CCM used for a failure detection of a member segment of the first protection group, wherein the 3-tuple of the ESP is <ESP-DA, ESP-SA, ESP-VID> and the 2-tuple is <ESP-DA, ESP-VID>; the ESP-DA is a destination MAC address of the ESP configured for forwarding a CCM, which is dedicated to an inter-segment failure diagnosis, on a working segment or protection segment; the ESP-SA is a source MAC address of the ESP configured for forwarding the CCM, which is dedicated to the inter-segment failure diagnosis, on the working segment or protection segment; the ESP-VID is a VLAN ID to which the member segment, in which the second protection group is located, of the first protection group belongs.

Through the above embodiments of the present invention, present network resources can be fully utilized to particularly protect an important segment, and the reliability and the failure recovery capability of a network can be greatly improved.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for protecting a tunnel, comprising:
    setting a second protection group on two intermediate nodes of a first protection group; and
    when a segment between the two intermediate nodes fails, adopting the second protection group to protect the tunnel,
    wherein the step of adopting the second protection group to protect the tunnel comprises:
    adding, to a protected member of the second protection group, a 2-tuple in a 3-tuple of an Ethernet Switch Path (ESP) corresponding to a Connectivity Check Message (CCM) through which a member segment of the first protection group performs a failure detection, wherein the 3-tuple of the ESP is <ESP-DA, ESP-SA, ESP-VID> and the 2-tuple is <ESP-DA, ESP-VID>; the ESP-DA is a destination Media Access Control (MAC) address of the ESP configured for forwarding a CCM, which is dedicated to an inter-segment failure diagnosis, on a working segment or a protection segment; the ESP-SA is a source MAC address of the ESP configured for forwarding the CCM, which is dedicated to the inter-segment failure diagnosis, on the working segment or the protection segment; and the ESP-VID is a Virtual Local Area Network Identification (VLAN ID) to which a member segment, in which the second protection group is located, of the first protection group belongs.

2. The method according to claim 1, wherein the step of adopting the second protection group to protect the tunnel comprises:
    setting a duration of a first timer to be longer than that of a second timer, wherein the first timer is configured to record a duration of waiting for a protection switch after the first protection group fails, and the second timer is configured to record a duration of waiting for a protection switch after the second protection group fails.

3. The method according to claim 2, wherein the first timer and/or the second timer are/is hold-off timer(s).

4. The method according to claim 1, wherein the source MAC address and/or the destination MAC address are/is MAC address(es) of Segment Edge Port(s) (SEP(s)) of the protection group.

5. A method for protecting a tunnel, comprising:
    nesting a first Infrastructure Protection Group (IPG1) and a second Infrastructure Protection Group (IPG2), wherein two SEPs and all Segment Intermediate Ports (SIPs) of one member segment in the IPG1 share ports with all SIPs of one member segment in the IPG2; and
    using the IPG1 and the IPG2 to associate a same group of tunnels,
    wherein the step of using the IPG1 and the IPG2 to associate the same group of tunnels comprises:
    detecting the member segment in the IPG2 using a group of CCMs;
    configuring to add, on an end point of the IPG1 that a CCM enters, forwarded information of a layer-2 header corresponding to the CCM, which enters the IPG1, to a protection list associated with the end point, wherein the layer-2 header is a 3-tuple of <ESP-DA, ESP-SA, ESP-VID>; the forwarded information consists of a 2-tuple of <ESP-DA, ESP-VID>; and the protection list is a 2-tuple list associated with the end point of the IPG1.

6. The method according to claim 5, wherein both the IPG1 and the IPG2 comprise a working segment and a protection segment; and the step of using the IPG1 and the IPG2 to associate the same group of tunnels comprises:
when the working segment in the IPG1 is unavailable, adopting the protection segment in the IPG1 to protect the tunnel.

7. The method according to claim 5, wherein both the IPG1 and the IPG2 comprise a working segment and a protection segment; and the step of using the IPG1 and the IPG2 to associate the same group of tunnels comprises:
when both the working segment and the protection segment in the IPG1 are unavailable, adopting the protection segment in the IPG2 to protect the tunnel.

8. The method according to claim 5, wherein the IPG1 is an internal IPG and the IPG2 is an external IPG.

9. The method according to claim 5, wherein both the IPG1 and the IPG2 comprise a working segment and a protection segment; and the step of using the IPG1 and the IPG2 to associate the same group of tunnels comprises:
configuring an independent Maintenance Association (MA) on the working segment and the protection segment of the IPG1 and on the working segment and the protection segment of the IPG2 respectively, wherein the MA is used to detect states of the working segment and the protection segment in the IPG1 and the IPG2.

10. The method according to claim 5, wherein the step of using the IPG1 and the IPG2 to associate the same group of tunnels comprises:
setting duration of a first timer of the IPG2 to be longer than that of a second timer of the IPG1.

11. The method according to claim 10, wherein the first timer is a hold-off timer, related to the IPG2, for recording a hold-off duration from the occurrence of a failure to the occurrence of a protection switch; the second timer is a hold-off timer, related to the IPG1, for recording a hold-off duration from the occurrence of a failure to the occurrence of a protection switch.

12. The method according to claim 5, wherein the tunnels associated by the IPG1 and the IPG2 together are Traffic Engineering Service Instances (TESIs).

13. The method according to claim 5, wherein the member segment in the IPG1 is a working segment or a protection segment in the IPG1; and the member segment in the IPG2 is a working segment or a protection segment in the IPG2.

14. An apparatus for protecting a tunnel, comprising:
a setting module, configured to set a second protection group on two intermediate nodes of a first protection group; and
a protection module, configured to adopt the second protection group to protect the tunnel when a segment between the two intermediate nodes fails,
wherein the protection module comprises:
an adding sub-module, configured to add, to a protected member of the second protection group, a 2-tuple in a 3-tuple of an ESP corresponding to a CCM through which a member segment of the first protection group perform a failure detection, wherein the 3-tuple of the ESP is <ESP-DA, ESP-SA, ESP-VID> and the 2-tuple is <ESP-DA, ESP-VID>; the ESP-DA is a destination MAC address of the ESP configured for forwarding a CCM, which is dedicated to an inter-segment failure diagnosis, on a working segment or a protection segment; the ESP-SA is a source MAC address of the ESP configured for forwarding the CCM, which is dedicated to the inter-segment failure diagnosis, on the working segment or the protection segment; the ESP-VID is a VLAN ID to which a member segment, in which the second protection group is located, of the first protection group belongs.

15. The apparatus according to claim 14$, wherein the protection module comprises:
a setting sub-module, configured to set a duration of a first timer to be longer than that of a second timer, wherein the first timer is configured to record a duration of waiting for a protection switch after the first protection group fails, and the second timer is configured to record a duration of waiting for a protection switch after the second protection group fails.

* * * * *